United States Statutory Invention Registration [19]

[11] Reg. Number: H178

Biggar [43] Published: Dec. 2, 1986

[54] RESERVE BATTERY WITH IMPROVED WET-STAND CHARACTERISTICS

[75] Inventor: Allan M. Biggar, Arlington, Va.

[73] Assignee: The United States of America as represented by the Secretary of the Army, Washington, D.C.

[21] Appl. No.: 795,135

[22] Filed: Nov. 5, 1985

[51] Int. Cl.[4] ..... H01M 6/36; H01M 6/38

[52] U.S. Cl. ..... 429/114

[58] Field of Search ..... 429/110, 114, 116

[56] References Cited

U.S. PATENT DOCUMENTS

| | | | |
|---|---|---|---|
| 2,996,564 | 8/1961 | Morton | 429/114 |
| 3,103,452 | 9/1963 | Comanor et al. | 429/110 X |
| 3,432,360 | 3/1969 | Cleveland | 429/114 |
| 3,464,863 | 9/1969 | Barron | 429/114 |

OTHER PUBLICATIONS

Edmund Scientific Co., Information and Instructions Leaflet 711051, Rev. 7/77, entitled "Bench Collimator (N-3C Gunsight) No. 70,774", pp. 1-4.

Earle B. Brown, *Modern Optics*, Copyright 1965 by Reinhold Publishing Corp., Sections 6.9 and 6.10, pp. 245-248.

*Primary Examiner*—John F. Terapane
*Assistant Examiner*—Susan Wolffe
*Attorney, Agent, or Firm*—Saul Elbaum; Thomas E. McDonald; Anthony T. Lane

[57] ABSTRACT

A reserve battery which includes a plurality of series-connected battery cells which are simultaneously filled with electrolyte from a reservoir through a like plurality of filling conduits formed of electrically-insulating material and connected respectively between the reservoir and the cells. In one embodiment, the cross-sectional area of each filling conduit is several orders of magnitude smaller than the area of each cell electrode active surface and the length of each filling conduit exceeds the square root of the filling conduit cross-sectional area by at least two orders of magnitude, to thus minimize intercell short circuits. In another embodiment, each filling conduit includes a gas generator disposed therein to contact electrolyte flowing therethrough and formed of a material which generates a gas when brought into contact with the electrolyte, so that after the cell has been sufficiently filled with electrolyte, gas generated by the gas generator will displace electrolyte in the filling conduit to thus electrically isolate the cell from the reservoir.

13 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RESERVE BATTERY WITH IMPROVED WET-STAND CHARACTERISTICS

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention relates generally to electrochemical batteries, and more particularly, to a reserve or deferred action battery having improved wet-stand characteristics.

2. Prior Art

Reserve batteries have been used extensively to provide a reliable source of portable electrical power after long periods of storage. One form of reserve battery, widely used as a source of in-flight electrical power for components of artillery projectiles, employs a number of series-connected cells which are stored in a dry condition and are filled during flight of the projectile with electrolyte from a common electrolyte supply which is made available to the battery cells only when the projectile has been suitably launched from a weapon. Ordinarily, such batteries are required to survive for only a short period of time ranging from a few seconds to as much as two minutes. Furthermore, there are often centrifugal forces available which make it possible to fill all the cells rapidly, to equalize their electrolyte levels, and to thereafter keep the electrolyte from any given cell from making contact with components of any other cell as long as the projectile continues to spin as it normally does during flight. This type of reserve battery is adequate for in-flight use, but ordinarily has very limited ability to supply reliable power after the projectile has come to rest. However, for some applications, it would be highly desirable to use a series-connected reserve battery of this general type, which would continue to deliver power for an extended time after flight of the projectile has ended.

SUMMARY OF THE INVENTION

Therefore, it is a primary object of the invention to provide a reserve battery capable of delivering power for a relatively long time, (hours or days) after the battery has been activated.

It is a further object of the invention to provide a reserve battery for use in an artillery projectile, which is activated upon firing of the projectile, and which will continue to deliver power for an extended period of time after the flight of the projectile has ended and it has come to rest.

In the preferred embodiment of the invention, the reserve battery includes the plurality of cells electrically connected in series. Each cell is completely sealed except for a filling tube or channel, and, optionally, a venting channel. Each filling channel is formed of electrically insulating, non-wetting material, and has a length which greatly exceeds the square root of the cross sectional area of the channel. Also, each filling channel has affixed therein a gas-generating element formed of material which generates a gas when brought into contact with the battery electrolyte.

When the battery is actuated, electrolyte from a common reservoir is simultaneously forced into each battery cell through the filling channels of the cells. During this filling operation, the battery cells are actually short circuited by the electrolyte connecting one cell with another through the individual filling channels of these cells and the common reservoir of electrolyte. However, this short circuiting of the battery cells is minimized by the use of relatively long filling channels of small cross section. Also, the filling operation is accomplished quickly since all of the battery cells are filled simultaneously.

During the filling operation, the electrolyte flowing through each filling channel is brought into contact with the gas-generating element therein, which immediately starts to generate gas. After each cell has been sufficiently filled with electrolyte, each gas-generating element will generate enough gas to displace the electrolyte in part or all of the filling channel and thus electrolytically isolate each battery cell from the electrolyte common reservoir and from every other battery cell. By thus eliminating such electrolytic short circuits between the battery cells, the operating life of the battery is greatly extended.

Also, when the reserve battery is disposed in an artillery missile and the electrolyte forced into the battery cells by the centrifugal force resulting from the spinning of the missile during flight, the cell filling channels can be disposed such that the gas blocks generated by the gas generators will be maintained within these channels after the projectile has come to rest.

BRIEF DESCRIPTION OF THE DRAWINGS

The invention will be better understood, and further objects, features, and advantages thereof will be become more apparent from the following description of the preferred embodiments, taken in conjunction with the accompanying drawings in which.

DESCRIPTION OF THE PREFERRED EMBODIMENT

Figure 1:
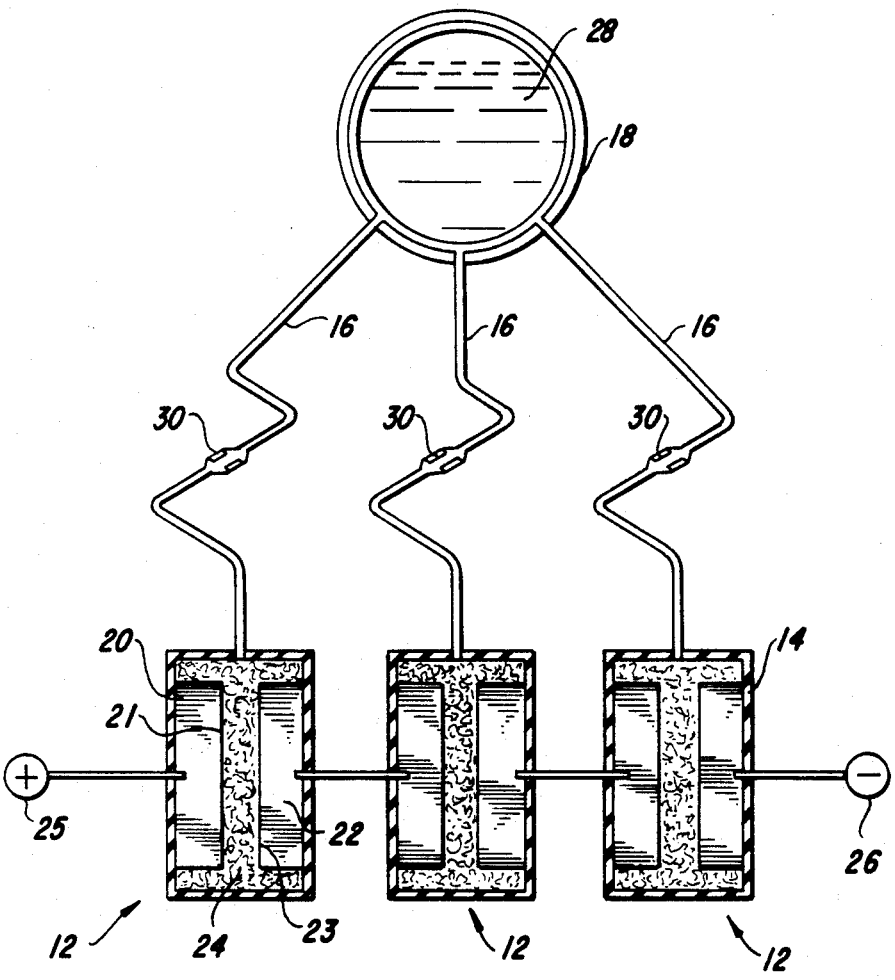
FIG. 1 is a schematic representation of a preferred embodiment of the invention.

FIG. 1 shows a reserve battery, according to the invention, which is disposed within an artillery projectile. The battery 10 includes a plurality of individual cells 12, each having a housing 14 connected by an electrolyte filling conduit 16 to a common electrolyte reservoir 18. Each cell 12 includes a positive electrode 20 having an active surface 21 and a negative electrode 22 having an active surface 23 which is spaced from the active surface 21 of the positive electrode 20 by a spacer 23 formed of a porous material, such as asbestos, paper and/or hemp, which absorbs the electrolyte and maintains the electrodes 20, 22 in contact with the electrolyte. The use of such porous spacers are well known to the art, as, for example, the paper spacers described in U.S. Pat. No. 3,432,360, issued Mar. 11, 1969 to Cleveland. The plurality of cells 12 are electrically connected in series to the positive and negative output terminals 25, 26 of the battery.

The electrolyte reservoir 18 includes a ruptuable sealed ampule 28 containing a supply of electrolyte, which is opened by acceleration and/or other forces exerted on it when the projectile is fired. This type of self-opening electrolyte container is well known to the art. For example, the electrolyte reservoir 18 and ampule 28 may be similiar to that described in U.S. Pat. No. 3,507,707, issued Apr. 21, 1972 to Biggar, or to that described in U.S. Pat. No. 3,464,863, issued Sept. 2, 1969 to Barron.

The length of each filling conduit 16 exceeds the square root of the cross-sectional area of the conduit 16 by at least two orders of magnitude, and the area of each electrode active surface exceeds the cross-sectional area of the conduit 16 by at least three orders of magnitude. For example, in one embodiment of the invention, one-sixteenth inch diameter tubing was used for the filling conduits 16 and the dimensions of each electrode active area was approximately ten inches by three-quarter inch. Further, each electrode was formed of porous material which greatly increased the effective area of its active surface.

Figure 2:
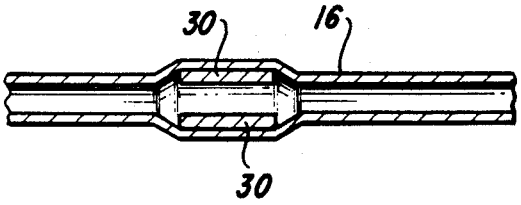
FIG. 2 is a partial cross-sectional view of a cell filling tube, showing a gas generator disposed therein.

Each filling conduit 16 is formed of an electrically insulating non-wetting material, such as Teflon, a plastic material manufactured by the E.I. DuPont Corp., Wilmington, Del. Also, each filling conduit 16 carries a gas generator 30 formed of the material which generates a gas when it is brought into contact with the battery electrolyte. The gas generator 30 is shaped and disposed within the filling conduit 16 in such a way that it does not unduly restrict the flow of electrolyte through the conduit 16. For example, the gas generator 30 may be formed as a tubular section which is forced into a flexible plastic filling conduit 30 of the same diameter, as shown in FIG. 2.

The battery cells 12 can be disposed relative to the electrolyte reservoir 18 such that, after the artillery projectile has been fired and the electrolyte ampule 28 opened, the normal spinning of the projectile during flight will produce a centrifugal force on the electrolyte within the reservoir 18, causing it to flow through the filling conduits 16 into the cells 12. During the filling operation, these cells 12 will be short-circuited by the electrolyte flowing through the filling conduits 16 from the electrolyte reservoir 18. However, even without the gas generators 30, these short circuits are reduced to such a low level by the use of the long, small cross-section, filling conduits 16 that the battery can withstand them for more than an hour and still supply useful electrical output power.

Each gas generator 30 will start to generate gas as soon as it is brought into contact with the electrolyte; however, it is of a size and shape such that it will not generate enough gas to block the filling conduit 16 until the battery cell 12 has been completely filled with electrolyte. Thereafter, the gas bubble generated within the filling conduit 16 by the gas generator 30 drives out the electrolyte from at least part of the filling conduit 16 to electrolytically isolate the cell 12 from the electrolyte reservoir 18 and from all other cells 12, and further extend the operating life of the battery.

A large number of chemical mixtures are used as electrolytes in batteries. However, in reserve or deferred action type batteries, the electrolyte is usually a water solution of some strong acid (such as fluorboric acid) or of some base (such as potassium hydroxide). The choice of gas-generating material forming the gas generator 30 depends on the type of electrolyte being used. For example, with an acid electrolyte the gas generator 30 might consist of metallic zinc and with an alkaline electrolyte it might consist of metallic aluminum. In either of these examples the gaseous product would be hydrogen. Other types of electrolytes (even non-aqueous ones) and other gas-producing materials, which would yield oxygen, nitrogen, carbon dioxide, etc., could be used to form the gas generator 30.

Each filling conduit 16 can be shaped and disposed so as to assure that the gas bubble generated by the gas generator 30 remains within the conduit 16 after the cell 12 has been filled with electrolyte and the projectile has come to rest. For example, the filling conduit 16 can be looped or formed as a spiral conduit, as shown in FIG. 1.

In the preferred embodiment of the invention, once each cell 12 has been filled with electrolyte, the electrolyte is held within the cell 12 by capillary action of the porous spacer 24. However, in reserve batteries containing little or no porous material such that the battery can be freely drained of electrolyte, a conventional check valve, such as a captive ball type check valve, can be disposed between the cell 12 and the filling conduit 16 to prevent the electrolyte within the cell 12 from flowing back into the electrolyte reservoir 18 in the event that the cell 12 is disposed directly above the electrolyte reservoir 18 when the projectile comes to rest.

There are many variations, additions, and modifications to the invention. For example, the plurality of series-connected cells 12 could include intermediate, bi-polar electrodes separating adjacent cells 12, each bi-polar electrode serving as the positive electrode 20 of one cell 12 and the negative electrode 22 of an adjacent cell 12, similiar to the series-connected cells described in U.S. Pat. No. 4,065,606, issued Dec. 27, 1977 to Casson, or in U.S. Pat. No. 2,996,564, issued Aug. 15, 1961 to Morton. Each intermediate electrode would consist of a plate of conductive material coated on one active side with a metal, such as lead, and on the other active side with a non-metal, such as lead oxide.

In another modification of the invention, the electrolyte reservoir 18 could consist of a flexible container against which a spring element acts to force the electrolyte through the filling conduits 16 into the cells 12, similiar to the reserve battery described in U.S. Pat. No. 3,894,888, issued July 15, 1975 to Gold.

In view of the many variations, adaptations, and modifications which would be obvious to one skilled in the art, it is intended that the scope of this invention be limited only by the appended claims.

What is claimed and desired to be secured by Letters Patent of the United States is:

1. A reserve battery which comprises:

a positive terminal;

a negative terminal;

a plurality of battery cells electrically connected in series between the positive terminal and the negative terminal, each cell including a positive electrode having an active surface and a negative electrode having an active surface which is spaced from the positive electrode active surface;

a reservoir for receiving electrolyte;

electrolyte supply means for supplying electrolyte to the reservoir;

a like plurality of filling conduits formed of electrically insulating material and extending respectively between the cells and the reservoir to establish communication between each cell and the reservoir;

means for exerting a force on electrolyte within the reservoir to cause the flow of electrolyte through the filling conduits into the cells; and a like plurality of gas generators disposed respectively within the filling conduits to contact electrolyte flowing therethrough, each gas generator comprising a material which generates a gas when brought into contact with the electrolyte.

2. A reserve battery, as described in claim 1, wherein:

the area of each cell electrode active surface exceeds the cross-sectional area of each filling conduit by at least three orders of magnitude; and the length of each filling conduit exceeds the square root of the cross-sectional area of the filling conduit by at least two orders of magnitude.

3. A reserve battery, as described in claim 1, wherein:

the reserve battery is disposed within an artillery projectile;

the electrolyte supply means comprises a ruptuable sealed ampule which is disposed within the reservoir and which is opened by forces exerted on it when the projectile is fired; and the means for exerting a force on the electrolyte is a centrifugal force produced by spinning of the projectile during its flight, the cells being disposed relative to the reservoir so that this centrifugal force will cause the electrolyte to flow from the reservoir through the filling conduits into the cells.

4. A reserve battery, as described in claim 1, wherein each cell further comprises porous material disposed between the positive and negative electrodes for absorbing the electrolyte and maintaining the electrodes in contact with the electrolyte.

5. A reserve battery, as described in claim 1, wherein each filling conduit comprises a flexible plastic tubing, and each gas generator is a tubular element which has the same inside diameter as the inside diameter of the filling conduit tubing and which is forced into the filling conduit tubing to secure it therein.

6. A reserve battery, as described in claim 1, wherein the electrolyte is an acid solution and the gas generator is formed of metallic zinc.

7. A reserve battery, as described in claim 1, wherein the electrolyte is an alkaline solution and the gas generator is formed of metallic aluminum.

8. A reserve battery, as described in claim 1, wherein each filling conduit is shaped and disposed so as to maintain a gas bubble generated by the gas generator within the filling conduit after the cell connected to the filling conduit has been filled with electrolyte.

9. A reserve battery which comprises:

a positive terminal;

a negative terminal;

a plurality of battery cells electrically connected in series between the positive terminal and the negative terminal, each cell including a positive electrode having an active surface and a negative electrode having an active surface which is spaced from the positive electrode active surface;

a reservoir for receiving electrolyte;

electrolyte supply means for supplying electrolyte to the reservoir;

a like plurality of filling conduits formed of electrically insulating material and extending respectively between the cells and the reservoir to establish communication between each cell and the reservoir, the area of each cell electrode active surface exceeding the cross-sectional area of each filling conduit by at least three orders of magnitude, and the length of each filling conduit exceeding the square root of the cross-sectional area of the filling conduit by at least two orders of magnitude; and means for exerting a force on electrolyte within the reservoir to cause the flow of electrolyte through the filling conduits into the cells.

10. A reserve battery, as described in claim 9, wherein:

the reserve battery is disposed within an artillery projectile;

the electrolyte supply means comprises a ruptuable sealed ampule which is disposed within the reservoir and which is opened by forces exerted on it when the projectile is fired; and the means for exerting a force on the electrolyte is a centrifugal force produced by spinning of the projectile during its flight, the cells being disposed relative to the reservoir so that this centrifugal force will cause the electrolyte to flow from the reservoir through the filling conduits into the cells.

11. A reserve battery, as described in claim 10, wherein each cell further comprises porous material disposed between the positive and negative electrodes for absorbing the electrolyte and maintaining the electrodes in contact with the electrolyte.

12. A reserve battery, as described in claim 11, which further comprises a like plurality of gas generators disposed respectively within the filling conduits to contact electrolyte flowing therethrough, each gas generator comprising a material which generates a gas when brought into contact with the electrolyte.

13. A reserve battery, as described in claim 12, wherein each filling conduit is shaped and disposed so as to maintain a gas bubble generated by its gas generator within the filling conduit after the projectile has come to rest.

* * * * *